Figure 1:
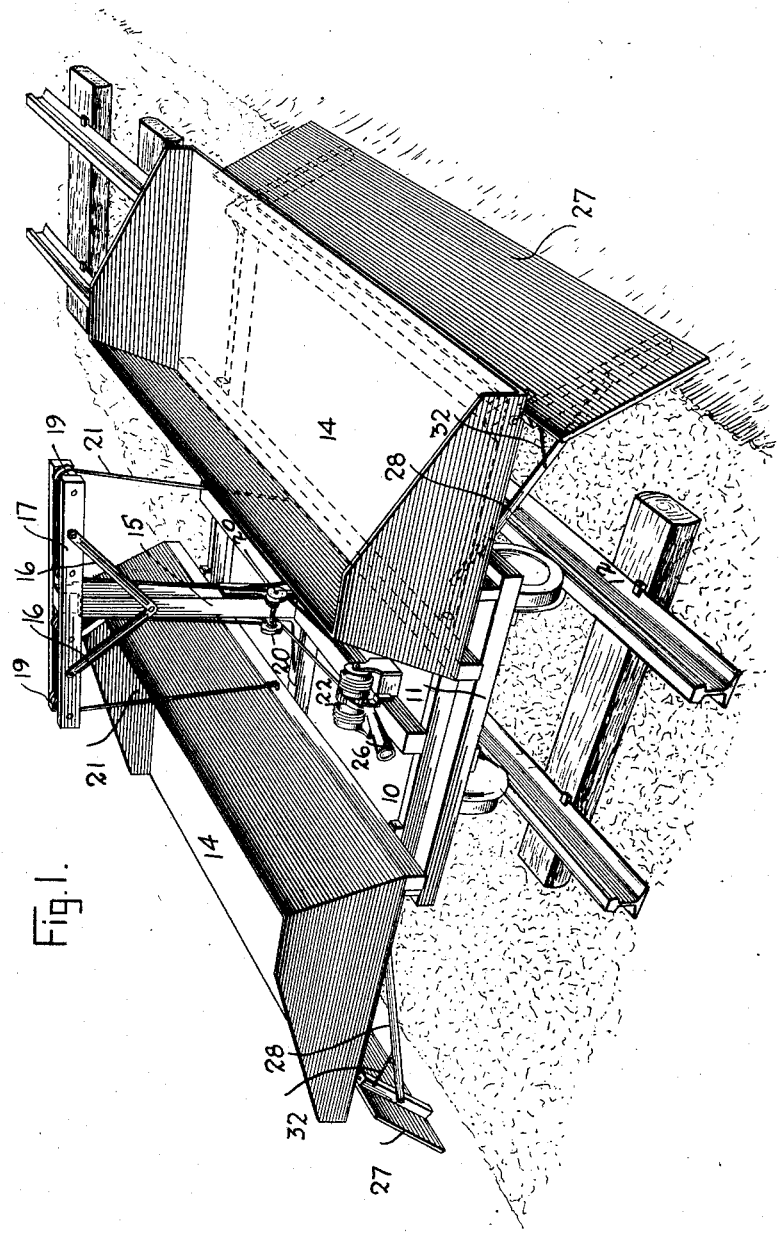

T. WALKER.
DUMP CAR.
APPLICATION FILED JAN. 5, 1911.

998,432.

Patented July 18, 1911.
2 SHEETS—SHEET 1.

WITNESSES

INVENTOR
Thomas Walker
BY
ATTORNEYS

T. WALKER.
DUMP CAR.
APPLICATION FILED JAN. 5, 1911.
998,432.
Patented July 18, 1911.
2 SHEETS—SHEET 2.
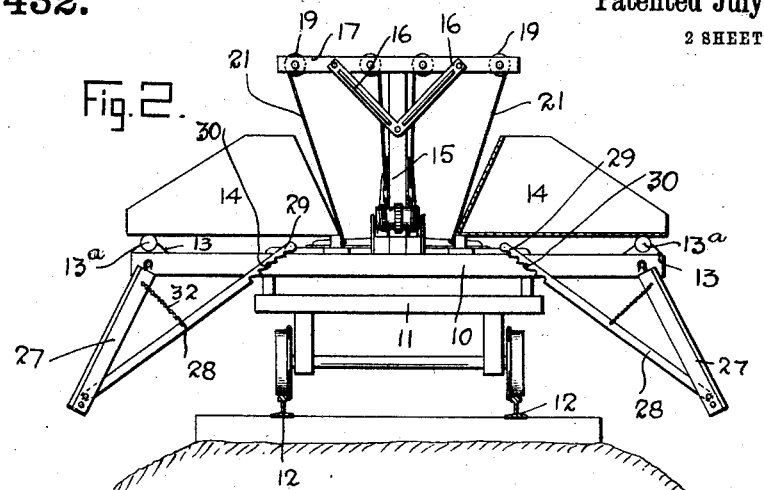
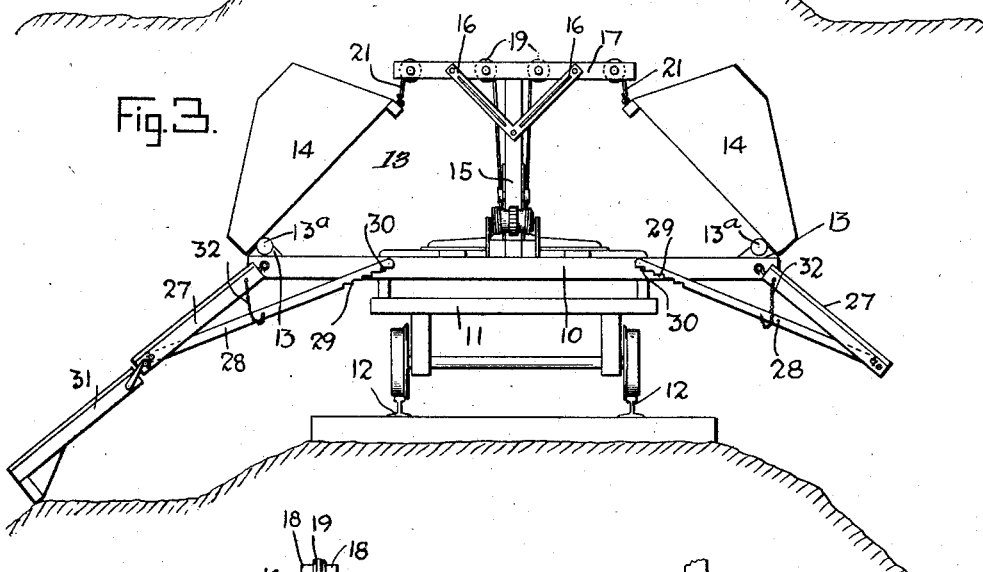
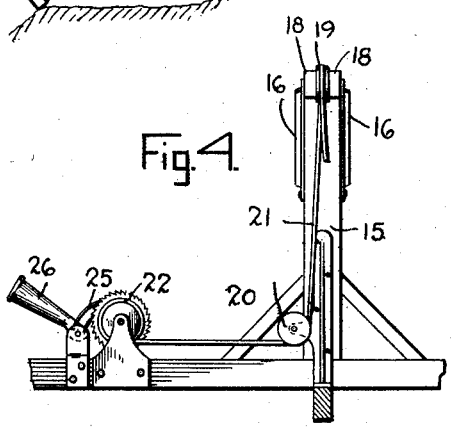
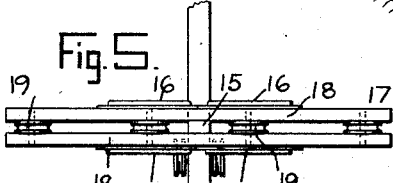
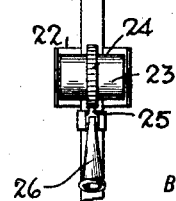
WITNESSES
INVENTOR
Thomas Walker
BY
ATTORNEYS

UNITED STATES PATENT OFFICE.

THOMAS WALKER, OF PARIS, KENTUCKY.

DUMP-CAR.

998,432. Specification of Letters Patent. Patented July 18, 1911.

Application filed January 5, 1911. Serial No. 600,920.

*To all whom it may concern:*

Be it known that I, THOMAS WALKER, a citizen of the United States, and a resident of Paris, in the county of Bourbon and State of Kentucky, have invented a new and Improved Dump-Car, of which the following is a full, clear, and exact description.

The invention relates to loading and unloading and has for an object to provide a car for quickly and efficiently dumping material. For the purpose mentioned use is made of a truck, a platform thereon, receptacles mounted to repose on the platform, means for raising the inner ends of the receptacles to tilt the same, aprons hingedly and adjustably mounted on the platform and adapted to slidably receive the material dumped from the said receptacles, and auxiliary aprons for removable attachment to the said aprons.

In my device, I aim to provide a means whereby when material is dumped from the dump car, portions of the said material will not be deposited on the ballast or road over which the car is operated and impede the progress of the car over the road.

Reference is to be had to the accompanying drawings constituting a part of this specification, in which similar characters of reference denote corresponding parts in all the views, and in which—

Figure 1 is a perspective view of my dump car and showing the same in normal position; Fig. 2 is an end view of the dump car; Fig. 3 is an end view showing my dump car in dumping position; Fig. 4 is a fragmentary side elevation of the windlass and mast, with parts conveniently shown in section, and Fig. 5 is a fragmentary plan view of the mast, cross member and windlass.

Referring more particularly to the various views, I employ a platform 10 mounted on a truck 11 adapted to move over rails 12. Suitable bearings 13 are mounted at both sides of the platform 10 and receptacles 14 are mounted to repose on the said bearings and the platform, the said receptacles being in engagement with the said bearings, whereby the receptacles may turn about the bearings 13 as a center.

A mast 15 is mounted vertically on the platform 10 between the receptacles 14, and secured to the mast 15 by suitable braces 16 is a cross member 17 consisting of spaced members 18 having pulleys 19 mounted therebetween. Pulleys 20 are mounted on the mast 15 and cables 21 are mounted in the pulleys 19 and 20, with one end of each of the cables attached to the inner sides of each of the receptacles 14, the other ends of the cables being attached to a windlass 22, consisting of a hollow drum 23 provided with a ratchet 24 adapted to be engaged by a pawl 25 on a lever 26 mounted on a brace of the platform 10, the mentioned parts being arranged in connection with the cables to raise the said inner ends of the receptacles to tilt the same when the pawl is operated to engage the ratchet 24.

Hingedly mounted on the platform 10, beneath the receptacles 14, are aprons 27, having hingedly connected thereto adjusting levers 28 provided with racks 29 for engagement with rods 30 on the platform 10.

Hingedly mounted on the aprons 27 are auxiliary aprons 31 provided for detachable engagement with the aprons 27 and adapted to prevent any material from the dump car from falling on the rails 12 or therebetween.

In the operation of my device, the receptacles are positioned as shown in Fig. 2 when they are to be loaded with material. The car is then hauled or moved to the place of dumping and the auxiliary aprons 31 are attached to the aprons 27. Now by operating the windlass 22 the cables 21 are wound thereon, thus raising the ends of the receptacles 14 to tilt the same, as shown in Fig. 3, and dump the material therefrom. The aprons 27 and the auxiliary aprons 31 form a chute for the material to slide down on, and in this manner material from the receptacles will not be deposited on the rails 12 or the track on which the car is mounted to move. When the material has been dumped from the receptacles, the pawl 25 is disengaged from the ratchet 24, and the weight of the receptacles 14 will cause the same to reassume their normal position, conveniently shown in Fig. 2. By providing the adjusting rods 28 the aprons 27 can be easily adjusted, to permit of depositing the material from the receptacles 14 in the proper place, and by adjusting the aprons 27 a relative adjustment of the auxiliary aprons 31 is secured.

To prevent the rods 28 from dropping to the ground suitable chains 32 are attached to the undersides of the aprons 27 and connected to the rods 28.

Having thus described my invention, I claim as new and desire to secure by Letters Patent:

1. A dump car, comprising a truck, a platform on the truck, bearings on the platform, receptacles mounted on the said platform, a pivotal connection between each receptacle and the platform, means on the platform for raising the inner ends of the said receptacles, and aprons hingedly and adjustably mounted on the said platform beneath the said receptacles, the said aprons extending angularly at both sides of the platform, whereby the material contained in the said receptacles may be deposited at various distances from the sides of the car.

2. A dump car, comprising a truck, a mast on the truck, independently adjustable aprons pivotally mounted at each side of the car receptacles mounted on the truck, cables depending from the said mast with an end of each cable connected to each of the said receptacles, and means on the truck connected to the other ends of the said cables for raising the said receptacles when the said means are operated, whereby the material may be guided to different points on each side of the said truck.

3. A dump car, comprising a truck, a platform on the truck, independently movable and adjustable aprons carried by the platform at each side thereof, a mast on the platform, a cross member secured to the mast, receptacles mounted on the truck, cables mounted on the mast and depending from the cross member for attachment to the said receptacle, and means connected to the said cables for raising the inner ends of the said receptacles to tilt the same.

4. A dump car, comprising a truck, a platform on the truck, a mast on the platform, a cross member secured to the mast, receptacles movably mounted on the truck, cables mounted on the mast and depending from the cross member for attachment to the said receptacles, means connected to the said cables for raising the inner ends of the said receptacles to tilt the same, aprons hingedly and adjustably mounted on the said platform beneath the said receptacles, and independent of the said receptacles and auxiliary aprons for removable attachment to the said aprons, whereby the material released from the receptacles may be deposited on both sides of the car at various distances therefrom.

5. A dump car, comprising a truck, a platform on the truck, bearings on the platform, receptacles movably mounted on the said platform, a hinged connection between the platform and the said receptacles, a mast secured to the platform between the said receptacles, a cross member on the mast, cables mounted on the mast and depending from the cross member for attachment to the said receptacles, a windlass engaging the said cables for raising one end of the receptacles to tilt the same, aprons hingedly and adjustably mounted on the platform beneath the said receptacles, and independent and auxiliary aprons for removable attachment to the said aprons, whereby the outer ends of the aprons may be adjusted at various distances from the sides of the car, whereby the material carried by the car may be deposited at different distances therefrom.

In testimony whereof I have signed my name to this specification in the presence of two subscribing witnesses.

THOMAS WALKER.

Witnesses:
 GEO. L. DOYLE,
 FAY ARDROY.